(12) United States Patent
Vivanco et al.

(10) Patent No.: US 9,408,104 B1
(45) Date of Patent: Aug. 2, 2016

(54) CONTROL OF WIRELESS COMMUNICATION BASED ON PREDICTED IMPACT OF DATA BUNDLING

(71) Applicant: Sprint Spectrum L.P., Overland Park, KS (US)

(72) Inventors: Daniel A. Vivanco, Sterling, VA (US); Hemanth B. Pawar, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 160 days.

(21) Appl. No.: 14/297,023

(22) Filed: Jun. 5, 2014

(51) Int. Cl.
| | |
|---|---|
| *H04W 4/00* | (2009.01) |
| *H04W 28/02* | (2009.01) |
| *H04L 1/08* | (2006.01) |
| *H04L 1/18* | (2006.01) |
| *H04W 72/04* | (2009.01) |

(52) U.S. Cl.
CPC ............. *H04W 28/0205* (2013.01); *H04L 1/08* (2013.01); *H04L 1/189* (2013.01); *H04L 1/1819* (2013.01); *H04W 28/0226* (2013.01); *H04W 28/0247* (2013.01); *H04W 72/04* (2013.01); *H04L 1/1887* (2013.01); *H04W 72/048* (2013.01)

(58) Field of Classification Search
CPC ............... H04W 28/0205; H04W 28/0247; H04W 28/0226; H04W 72/12; H04W 72/04; H04W 72/048; H04W 72/0446; H04L 47/2475; H04L 47/803; H04L 47/805; H04L 47/822; H04L 67/32; H04L 1/08; H04L 1/189; H04L 1/1819; H04L 1/1887
USPC ......... 370/230, 252, 311, 328, 329, 331, 280, 370/336
See application file for complete search history.

(56) References Cited

U.S. PATENT DOCUMENTS

| | | | |
|---|---|---|---|
| 2009/0257408 A1* | 10/2009 | Zhang | H04L 1/189 370/336 |
| 2011/0032898 A1 | 2/2011 | Kazmi et al. | |
| 2013/0250924 A1 | 9/2013 | Chen et al. | |
| 2013/0272121 A1* | 10/2013 | Stanwood | H04L 47/2475 370/230 |
| 2015/0237644 A1* | 8/2015 | Golitschek Edler von Elbwart | H04W 72/12 370/329 |

\* cited by examiner

*Primary Examiner* — Kwang B Yao
*Assistant Examiner* — Harun Chowdhury (57) ABSTRACT

A method and system to help manage wireless communication with a UE in a manner that takes into account a predicted impact of data bundling, such as TTI bundling, with respect to communication of data during a session. When a radio access network (RAN) is going to serve a UE with data communication for a VoLTE call or other session that would trigger such bundling, the RAN will predict the extent of other data that will be communicated during the session, and the RAN will predict the impact, such as increased air interface load, that would result from data bundling of at least that other data communication. If the RAN thereby predicts that the impact of data bundling with respect to at least that other data communication will exceed a predefined threshold level, then the RAN will responsively take action to limit its air interface communication with the UE.

19 Claims, 4 Drawing Sheets

CONTROL OF WIRELESS COMMUNICATION BASED ON PREDICTED IMPACT OF DATA BUNDLING

BACKGROUND

Unless otherwise indicated herein, the information described in this section is not prior art to the claims and is not admitted to be prior art by inclusion in this section.

In some wireless communication systems, when data that is transmitted by a transmitting entity to a receiving entity is not received by the receiving entity, or is received by the receiving entity with one or more errors, the data may be re-transmitted. The re-transmission of data could occur either automatically or in response to feedback from the receiving entity. For example, in Long Term Evolution (LTE) systems and in other systems, a Hybrid Automatic Repeat Request (HARQ) procedure is used. In the HARQ approach, after a transmitting entity has transmitted a block of data, the transmitting entity waits to receive an HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins re-transmitting the data.

In order to reduce the delay associated with re-transmitting data, LTE supports a bundling option for data transmissions by a user equipment device (UE) in the Physical Uplink Shared Channel (PUSCH). Normally, a UE transmits data in one transmission time interval (TTI), which corresponds to a 1 millisecond (ms) subframe, and then waits to receive an HARQ response before re-transmitting the data or transmitting additional data. However, when TTI bundling is used, the UE transmits the same data repeatedly in two, three, or four consecutive TTIs (possibly varying each of these repeated transmissions by including different error correction coding in or with each one) and then waits to receive an HARQ response. This transmission of multiple instances of the same data (or substantially the same data) may consume a greater extent of PUSCH resources up front, but can allow for more robust reception of the data, without the delay that would be associated with the UE transmitting the data multiple times and waiting for an HARQ response after each transmission.

OVERVIEW

An LTE network may be arranged to automatically use TTI bundling when the UE is engaged in a voice-over-LTE (VoLTE) call or another such real-time communication session, where latency would be a particular issue. For instance, when a base station of such a network is serving a UE and detects initiation of a VoLTE call to or from the UE, the base station may responsively enter into a mode of operation in which the base station schedules TTI bundling of PUSCH transmissions from the UE for the duration of the call, to help reduce VoLTE latency and thereby improve call quality.

Unfortunately, however, application of TTI bundling for a UE may be an all or nothing process, applying to either all PUSCH transmissions from the UE or no PUSCH transmissions from the UE. Consequently, when a base station is serving a UE and invokes use of TTI bundling in response to initiation of a VoLTE call to or from the UE, the base station may schedule TTI bundling of not only the VoLTE data transmissions from the UE but also of other data transmissions from the UE during the call, even though those other data communications may be unrelated to the VoLTE call and may not be latency sensitive—such as browsing or text messaging communications for instance. As a result, application of TTI bundling may lead to increased use of PUSCH resources (e.g., two, three, or four fold) not only for the data of the VoLTE call but also for other data that the UE communicates during the VoLTE call. In some instances, this increased air interface load could present user experience issues and other problems.

Disclosed herein is a method and corresponding system to help manage wireless communication with a UE in a manner that takes into account a predicted impact of TTI bundling with respect to communication such additional data. In accordance with the disclosure, when a radio access network (RAN) is going to serve a UE with data communication for a VoLTE call or other session that would trigger use of TTI bundling, the RAN will predict the extent of other data that will be communicated with the UE during the session, and the RAN will predict the impact, such as increased air interface load, that would result from TTI bundling of at least that other data communication. If the RAN thereby predicts that the impact of TTI bundling with respect to at least that other data communication will be greater than a predefined threshold level, then the RAN will responsively take action to limit its air interface communication with the UE. For instance, the RAN may responsively throttle data communication with the UE or may force the UE to hand over to be served by a different base station.

Optimally, the RAN may be arranged to carry out this process in instances when the RAN deems the air interface to be threshold highly loaded in the first place, such as where the RAN determines that load on the air interface exceeds a predefined threshold or is likely to exceed a predefined threshold. Thus, in response to detecting threshold air interface load and detecting a request to initiate a VoLTE call or other such session for a UE, the RAN may then predict the impact of TTI bundling with respect to at least other data communication that the UE would communicate during the session, and based on that predicted impact, the RAN may take action to limit air interface communication with the UE.

Accordingly, in one respect, disclosed is a method operable by a RAN, such as by a base station and/or other RAN entity. In accordance with the method, the RAN receives a request to serve a UE over an air interface with data communication of a session in an arrangement where serving the UE over the air interface with the data communication of the session will result in multiplied transmission over the air interface of the data communication of the session and multiplied transmission over the air interface of other data communication with the UE in addition to the data communication of the session. In response to the request, the RAN then determines an air interface load that would be attributable to at least the multiplied transmission of the other data communication with the UE over the air interface. Further, the RAN determines that the determined air interface load would exceed a predefined threshold. And responsive to determining that the determined air interface load would exceed the predefined threshold, the RAN takes action to limit communication over the air interface with the UE.

In addition, disclosed is a method for managing wireless communication in a RAN that is configured to serve UEs over an LTE air interface. In accordance with the method, the RAN receives a request to serve a UE with a VoLTE call over the air interface, in an arrangement where the RAN is configured to respond to initiation of the VoLTE call by applying TTI bundling to non-VoLTE data communication with the UE over the air interface. In turn, responsive to the request, (i) the RAN determines an extent of non-VoLTE data communication with the UE preceding the request, (ii) the RAN predicts an air interface load that would be attributable to at least the determined extent of non-VoLTE data communication when subjected to the TTI bundling, (iii) the RAN determines that the predicted air interface load exceeds a predefined threshold, and (iv) responsive to determining that the predicted air interface load exceeds the predefined threshold, the RAN takes action to limit communication over the air interface with the UE.

Further, disclosed is a base station arranged to carry out functions such as those described above. The base station may include an antenna structure that radiates to define a coverage area for serving UEs, and may further include a controller that manages wireless communication via the antenna structure, where the controller includes at least one processing unit, data storage, and program instructions stored in the data storage and executable by the at least one processing unit to carry out various functions. In an example implementation, the functions may include (a) detecting a request to wirelessly serve a UE with data communication of a packet-based real-time media session, where wirelessly serving the UE with the data communication of the packet-based real-time media session will result in multiplied wireless communication with the UE of data unrelated to the packet-based real-time media session, (b) responsive to the request, determining a load that would be attributable to at least the resulting multiplied wireless communication with the UE of the data unrelated to the session, (c) determining that the determined load would exceed a predefined threshold, and (d) responsive to determining that the determined load would exceed the predefined threshold, taking action to limit communication with the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This disclosure will focus primarily on LTE communication and particularly on the impact of TTI bundling with respect to non-VoLTE data communication in which a UE is predicted to engage during a VoLTE call. However, principles of the disclosure can apply in other contexts as well, including with respect to other types of air interfaces (beyond LTE), and with respect to data communication predicted to occur during other types of sessions (beyond VoLTE). Further, principles of the disclosure can apply with respect to not only uplink communications from a UE to a base station but also downlink communications from a base station to a UE. In addition, even within the context of the disclosed implementation(s), numerous variations are possible. For instance, various described machines, connections, functions, and other elements may be added, omitted, distributed, re-located, re-ordered, combined, or changed in other ways.

Referring to the drawings, as noted above, FIG. 1 is a simplified block diagram of an example network arrangement in which features of the present disclosure can be implemented. In particular, the figure depicts an example radio access network (RAN) 12 as an LTE network that is arranged to serve UEs and to provide connectivity with a packet-switched network 14.

Figure 1:
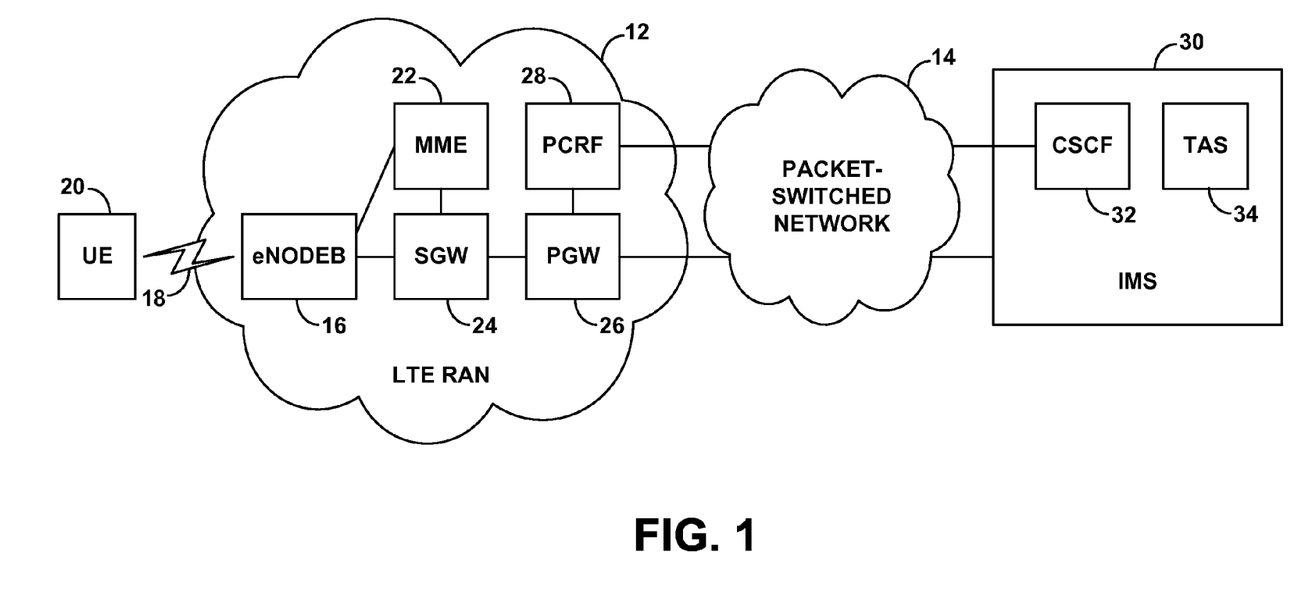
FIG. 1 is a simplified block diagram of a network in which the features of the present disclosure can be implemented.

As shown, the example LTE network includes a eNodeB (base station) 16 that radiates to provide air interface 18 through which to serve UEs, such as a representative UE 20 (e.g., a cell phone, a wirelessly-equipped computer, a tracking device, an embedded wireless communication module, or any other type of wireless communication device). Further, the LTE network includes a mobility management entity (MME) 22 that has a communication interface with the eNodeB, and a serving gateway (SGW) 24 that has communication interfaces with the eNodeB and the SGW. And still further, the LTE network includes a packet data network gateway (PGW) 26 that has a communication interface with the SGW and that provides connectivity with the packet-switched network, and a policy and charging rules function (PCRF) 28 that has a communication interface with the PGW.

As further shown, the example arrangement includes an Internet Multimedia Subsystem (IMS) platform 30 accessible via the packet-switched network, which functions to support voice over Internet Protocol (VoIP) call connections such as VoLTE calls and other such packet-based real-time media sessions. As shown, the IMS platform includes a Call Session Control Function (CSCF) 32 and a Telephony Application Server (TAS) 34. Further, the CSCF has a communication interface (e.g., via the packet-switched network) with the PCRF 28 of the LTE network, to facilitate working with the LTE network to set up VoLTE calls and other sessions for served UEs.

In accordance with LTE, when the UE enters into coverage of the eNodeB 16, the UE and LTE network may engage in an initial attach process through which the LTE network establishes for the UE one or more bearers extending between the UE and the PGW, for carrying data communications between the UE and the packet-switched network. In typical practice, for instance, the network may establish for the UE at least a default Internet bearer for carrying general "best efforts" data traffic (such web browsing traffic, file transfer traffic, and messaging traffic) between the UE and various remote network entities. Further, if the UE subscribes to VoLTE service, the network may also establish for the UE an IMS signaling bearer for carrying VoLTE call setup signaling such as Session Initiation Protocol (SIP) signaling between the UE and the IMS platform.

This initial setup of one or more bearers for the UE involves establishing for each bearer a respective virtual tunnel that includes a radio link tunnel extending between the UE and the eNodeB and a backhaul tunnel extending between the eNodeB and the PGW via the SGW. Further, the process involves establishing for the UE a logical "Radio Resource Configuration" (RRC) encompassing the one or more radio link portions.

In turn, if and when the UE seeks to place a voice call or the IMS platform seeks to connect a voice call to the UE, the UE and IMS platform may engage in a process to set up that voice call as a VoIP call and thus as a VoLTE call. In particular, the UE and IMS platform may exchange SIP signaling, which would flow through the UE's IMS signaling bearer, through the packet-switched network 14, and through the CSCF 32, in order to establish a packet-based real-time media session extending between the UE and the TAS or other node.

Further, in response to this SIP signaling, the CSCF may signal to the PCRF to notify the PCRF that a VoIP call for the UE is being established, and the PCRF may responsively signal to the PGW to cause the PGW to trigger setup for the UE of a dedicated IMS bearer for carrying VoLTE data traffic (namely, data representing speech). To set up this dedicated IMS bearer, the PGW may signal to the SGW, the SGW may signal to the MME, and the MME may signal to the eNodeB and SGW. Further, the eNodeB may responsively transmit to the UE an "RRC Connection Reconfiguration" message that notifies the UE of the addition of the dedicated IMS bearer to the UE's RRC connection. The eNodeB may then serve the UE over the air interface with VoLTE call communication, with the VoLTE call data (voice data) passing between the UE and the IMS platform via the UE's dedicated IMS bearer and via the packet-switched network.

In accordance with a recent version of LTE, the air interface on both the downlink and the uplink spans a particular frequency bandwidth (such as 1.4 MHz, 3 MHz, 5 MHz, 10 MHz, or 20 MHz) that is divided primarily into subcarriers spaced apart from each other by 15 kHz. Further, the air interface is divided over time into a continuum of 10-millisecond frames, with each frame being further divided into ten 1-millisecond subframes or TTIs that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the eNodeB to UEs, and other resource elements are reserved to define a physical downlink shared channel (PDSCH) for carrying bearer data transmissions from the eNodeB to UEs. Likewise, on the uplink, certain resource elements across the bandwidth are reserved to define a physical uplink control channel (PUCCH) for carrying control signaling from UEs to the eNodeB, and other resource elements are reserved to define a physical uplink shared channel (PUSCH) for carrying bearer data transmissions from UEs to the eNodeB.

In LTE, the eNodeB manages scheduling of the PUSCH and PDSCH resources to carry data communications to and from UEs on an as-needed basis. In particular, when a UE has data to transmit to the eNodeB, the UE may transmit a scheduling request to the eNodeB, and the eNodeB may responsively allocate one or more upcoming resource blocks on the PUSCH to carry that data and transmit on the PDCCH to the UE a downlink control information (DCI) message that directs the UE to transmit the data in the allocated resource blocks, and the UE may then do so. Likewise, when the eNodeB has data to transmit to the UE, the eNodeB may allocate PDSCH resource blocks to carry that data and may transmit on the PDCCH to the UE a DCI message that directs the UE to receive the data in the allocated resource blocks, and the eNodeB may thus transmit the data in the allocated resource blocks to the UE.

Because VoLTE is particularly latency sensitive, an eNodeB may schedule VoLTE transmissions from a UE to occur on a semi-persistent basis, so as to avoid or minimize the delay associated with the UE repeatedly sending scheduling requests and waiting for resource allocation. With semi-persistent scheduling (SPS), the eNodeB may transmit to the UE a DCI that allocates periodically recurring PUSCH resource blocks to carry data from the UE, and the UE may accordingly transmit data in those resource blocks, without the need to repeatedly request and receive resource allocation. (This process is called "semi-persistent," since the eNodeB can change the allocation if and when necessary during the call.)

Further, as discussed above, to help avoid the delay associated with the HARQ process when serving a UE with a latency sensitive communication such as data communication for a VoLTE call, the eNodeB may also impose use of TTI bundling. Thus, as the eNodeB schedules PUSCH resources for use to carry data from the UE to the eNodeB, the eNodeB may allocate resources in a sequence of TTIs and direct the UE to apply TTI bundling using those resources, and the UE may do so. For instance, for each TTI worth of data that the eNodeB would schedule for the UE, the eNodeB may schedule multiple (e.g., two, three, or four) such TTI's in sequence and direct the UE to apply TTI bundling, and the UE would then do so. Further, in the RRC Connection Reconfiguration message that the eNodeB sends to the UE to add the dedicated IMS bearer, the eNodeB may include a "ttiBundling" Boolean flag that notifies the UE that TTI bundling will be used moving forward.

Note also that, while TTI bundling would typically be used on the PUSCH, the eNodeB could also apply TTI bundling on the PDSCH, to help improve transmission of data to the UE. Thus, when the eNodeB schedules PDSCH resources to carry data from the eNodeB to the UE, the eNodeB may allocate resources in a sequence of TTIs and transmit multiple copies of the data in those TTIs, and the eNodeB may provide the UE with a DCI that directs the UE to read the data from the allocated TTIs.

As discussed above, however, when the eNodeB applies TTI bundling (for the PUSCH and/or PDSCH) in response to the UE engaging in data communication for a particular session, such as a latency sensitive session like a VoLTE call, the eNodeB may apply TTI bundling for not only that data communication but also for other data communication to or from the UE, even though that other data communication may be unrelated to the VoLTE call and may not be latency sensitive. Yet applying TTI bundling for such other data would necessarily result in use of additional air interface resources, which could contribute to an overall air interface load issue.

In practice, applying TTI bundling to such other data communication may result in multiplying the extent of air interface resources used for the data communication. For instance, if the air interface load is measured as a number of resource blocks allocated per unit time, such as per frame (e.g., on average), and if the eNodeB applies TTI bundling with a bundling factor of four, then communicating that other data would consume at least four times the number of resource blocks per unit time.

Furthermore, applying TTI bundling with respect to certain types of data communication may impact the air interface load even more, on grounds that the TTI bundling may improve success and speed of the data communication and thus allow a greater extent of communication to occur per unit time. For instance, if the other data communication is IP traffic being transmitted in accordance with the Transmission Control Protocol (TCP), greater success and speed of data communication may result in transmission of TCP allowing a greater quantity of data to be transmitted per unit time. Thus, if the eNodeB uses TTI bundling with a bundling factor of four, then communicating the data may consume greater than four times the underlying number of resource blocks, and perhaps on the order of six times as many resource blocks.

In accordance with the present disclosure, as noted above, when a RAN receives a request to serve a UE with data communication of a session such as VoLTE call, the RAN will determine whether air interface load that is likely to result from at least the multiplying of such other data communication during that session will exceed a threshold, and if so the RAN will responsively take action to limit its air interface communication with the UE.

In practice, the RAN may predict the extent of such other data communication with the UE in various ways, so as to then predict the impact of at least the multiplying of that other data communication during the session. By way of example, the RAN could monitor air interface data communication with the UE on an ongoing basis and could thereby observe an extent of such communication leading up to initiation of the session and could assume that such data communication would continue at the same rate during the session. For instance, if the eNodeB had allocated on the order of N resource blocks per unit time to carry data to and/or from the UE for a period of time leading up to initiation of the session, the eNodeB could assume that that communication would continue at about the same rate of N resource blocks per unit time during the session. Further, the eNodeB could take other factors into consideration to refine this prediction, such as considering whether such data communication was of a type that would likely end soon or the like. As another example, the RAN could monitor the extent to which the UE engages in data communication at particular times of day or in other situations, and the RAN could predict the extent of such data communication that would occur during the session based on a consideration of the current time of day or other current situation.

In turn, the RAN may predict the air interface load that would be attributable to at least the multiplying of that predicted extent of other data communication during the session. To make this prediction, the RAN may multiply the predicted extent of other data communication by the TTI bundling factor that the eNodeB would apply to the data communication, such as four for instance. Further, the RAN could determine that the likely data communication would be TCP data communication and could therefore multiply the predicted extent of data communication by a higher factor as noted above. For instance, the eNodeB or another RAN entity in the data communication path could perform deep packet inspection to evaluate the data communication leading up to initiation of the session and could thereby determine that the data communication is TCP communication, and the RAN could then assume that such TCP communication would continue during the session, with TTI bundling resulting in further multiplication of that TCP data communication as discussed above.

The predicted air interface load that would be attributable to at least multiplying of the predicted extent of other data communication with the UE may be a measure of how much air interface resource utilization the TTI bundling of such other data communication would add, or may be a measure of the total air interface resource utilization resulting from such multiplying of the other data communication. Further, the predicted air interface load may also encompass load attributable to multiplying of data communication of the session itself. Thus, for instance, if the RAN predicts that the eNodeB is likely to allocate N resource blocks per unit time for other data communication during a VoLTE call, and the RAN predicts that the eNodeB is likely to allocate M resource blocks per unit time for VoLTE data communication during the VoLTE call, and if the eNodeB will apply a TTI bundling factor of four during the VoLTE call, then the RAN could predict that the attributable air interface load will be 4*N, or perhaps 4*(N+M), and perhaps more if the RAN further determines that the other data communication is TCP communication.

Furthermore, at issue in this process could be the predicted rate of data communication or resource utilization during the session or the total predicted volume of data communication or resource utilization during the session. In terms of rate, for instance, the RAN could predict how many resource blocks per unit time the eNodeB would end up allocating as a result of applying TTI bundling to the other data communication during the session. And in terms of total volume, for instance, the RAN could predict such a rate and could further predict a likely duration of the session, based on past history of session duration for a similar time of day, similar location, between similar parties or the like, and could apply the predicted rate to the predicted duration to predict a predicted total volume.

The threshold against which the RAN compares its prediction may then be predefined by engineering design to be a level beyond which the air interface would be considered to be congested or excessively loaded. Thus, the threshold could be set at a specific rate of resource utilization, or a specific volume of resource utilization or the like. Further, the predefined threshold could be varied per time of day or based on other factors.

If the RAN thereby determines that the predicted air interface load that would be attributable to at least the multiplied transmission of the other data communication would exceed the predefined threshold, then the RAN may responsively take action to limit its air interface communication with the UE. For example, the RAN may responsively enter into a mode of throttling at least the other data communication with the UE, such as by imposing a cap on the extent of air interface resources that the eNodeB would allocate for the other data communication with the UE, or otherwise by restricting rate of such other data communication. And as another example, the RAN may responsively force the UE to hand over to be served by a different eNodeB or otherwise in a different coverage area (e.g., on a different carrier), such as one that has or is likely to have a less congested air interface. To do so, the eNodeB may engage in handover signaling with an adjacent eNodeB and may direct the UE to hand over to that adjacent eNodeB. Other examples are possible as well.

Figure 2:
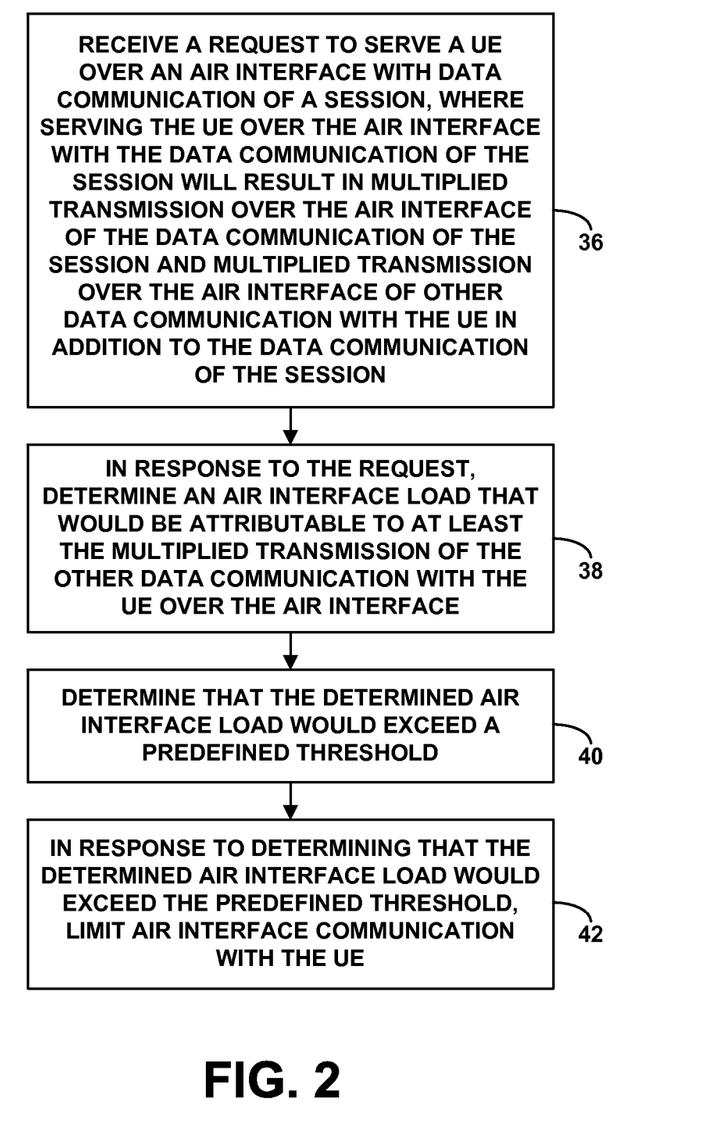
FIG. 2 is a flow chart depicting functions of a method that can be implemented in accordance with the disclosure.

FIG. 2 is a flow chart depicting these functions in summary, as functions carried out by a RAN such as by an eNodeB and/or other RAN entity. As shown in FIG. 2, at block 36, the RAN receives a request to serve a UE over an air interface with data communication of a session, in a scenario where serving the UE over the air interface with the data communication of the session will result in multiplied transmission over the air interface of the data communication of the session and multiplied transmission over the air interface of other data communication (i.e., other data communication if any) with the UE in addition to the data communication of the session. In the arrangement of FIG. 1, for instance, the eNodeB 16 may receive a signaling message requesting establishment of a dedicated IMS bearer for the UE, to carry data communication of a VoLTE call, and the eNodeB may be arranged as discussed above to apply TTI bundling with respect to the VoLTE data and with respect to other data communication to or from the UE, if any, for the duration of the VoLTE call.

In line with the discussion above, for instance, the multiplied transmission could include TTI bundling, which the RAN may apply in response to the session being a packet-based real-time media session such as a VoIP session and perhaps particularly a VoLTE session for instance, and the other data communication could be data communication that is unrelated to that session. For instance, if the session is a VoIP call, the other data communication might be browsing traffic, file transfer traffic, or messaging traffic that is unrelated to the voice communication.

At block 38, in response to the request, the RAN then determines an air interface load that would be attributable to at least the multiplied transmission of the other data communication with the UE over the air interface. In line with the discussion above, for instance, the RAN may determine a measure of actual data communication over the air interface with the UE preceding the request, and the RAN may predict the load by at least multiplying that determined measure by a predefined multiplication factor greater than one. Where the multiplied transmission includes TTI bundling with a bundling factor that is greater than one, such as a bundling factor of four, the RAN could responsively set the predefined factor at at least that bundling factor. Further, as discussed above, the RAN could determine that the other data communication comprises TCP data communication, and the RAN could responsively use a predefined factor that is greater than the TTI bundling factor. In addition, as discussed above, the RAN could determine the air interface load as a combination of at least (i) load that would be attributable to multiplied transmission of the other data communication with the UE over the air interface and (ii) load that would be attributable to the multiplied transmission of the data communication of the session over the air interface.

In turn, at block 40, the RAN then determines that that determined air interface load would exceed a predefined threshold, such as a predefined rate or total volume as discussed above. And at block 42, in response to determining that the determined air interface load would exceed the predefined threshold, the RAN limits its air interface communication with the UE, such as by throttling its air interface communication with the UE and/or forcing a handover of the UE.

Moreover, as noted above, the RAN could be arranged to carry out various functions as depicted in FIG. 2 in response to determining that the air interface is threshold highly loaded in the first place. For instance, if eNodeB 16 receives the request to serve the UE over air interface 18 with data communication of a VoLTE call, eNodeB 16 may then carry out the remaining functions in further response to the eNodeB determining that air interface 18 is already threshold highly loaded. Determining that the air interface is already threshold highly loaded may involve determining that the eNodeB already has at least a threshold high extent of upcoming air interface resources allocated or that the eNodeB is likely to have at least a threshold high extent of upcoming air interface resources allocated.

Figure 3:
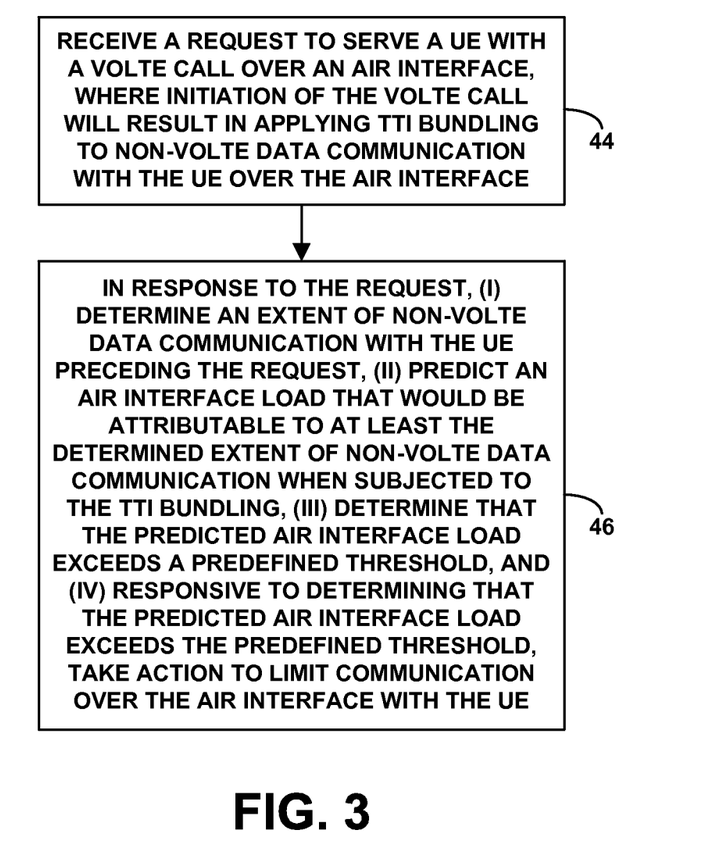
FIG. 3 is another flow chart depicting functions of a method that can be implemented in accordance with the disclosure.

FIG. 3 is next another flow chart depicting functions that can be carried out to manage wireless communication in RAN that is configured to serve UEs over an LTE air interface. As shown in FIG. 3, at block 44, the RAN receives a request to serve a UE with a VoLTE call over the air interface, in an arrangement where the RAN is configured to respond to initiation of the VoLTE call by applying TTI bundling to non-VoLTE data communication with the UE over the air interface. At block 46, in response to the request, (i) the RAN then determines an extent of non-VoLTE data communication with the UE preceding the request, (ii) the RAN predicts an air interface load that would be attributable to at least the determined extent of non-VoLTE data communication when subjected to the TTI bundling, (iii) the RAN determines that the predicted air interface load exceeds a predefined threshold, and (iv) responsive to determining that the predicted air interface load exceeds the predefined threshold, the RAN takes action to limit communication over the air interface with the UE.

Figure 4:
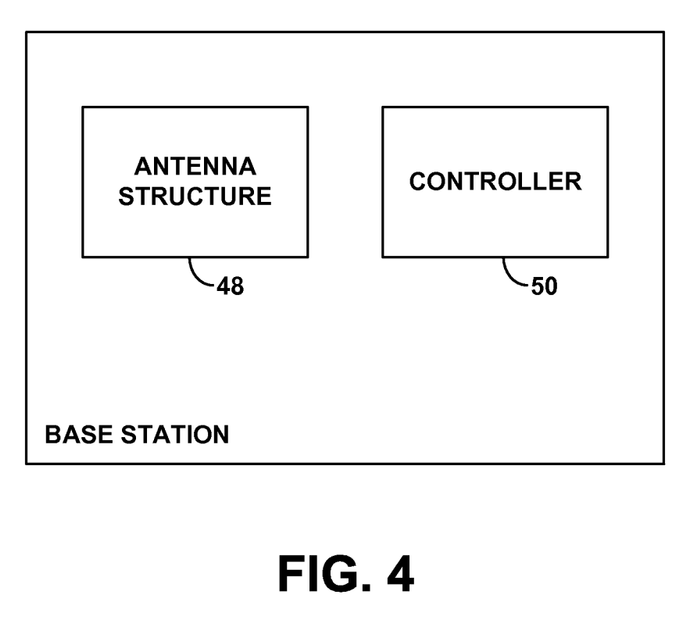
FIG. 4 is a simplified block diagram of an example base station that could carry out features of the disclosure.

Finally, FIG. 4 is a simplified block diagram of an example base station such as eNodeB 16, showing some of the components of such a base station that could be provided to facilitate implementation of functions such as those described above. As shown in FIG. 4, the example base station includes an antenna structure 48 that radiates to define an air interface coverage area for serving UEs. Further, the example base station includes a controller 50 that manages wireless communication via the antenna structure.

In practice, for instance, the controller may include at least one processing unit, data storage, and program instructions stored in the data storage and executable by the at least one processing unit to carry out various functions. For example, the functions may include detecting a request to wirelessly serve a UE with data communication of a packet-based real-time media session (e.g., a VoLTE session), where wirelessly serving the UE with the data communication of the packet-based real-time media session will result in multiplied wireless communication with the UE of data unrelated to the packet-based real-time media session (e.g., due to TTI bundling). Further, the functions may include, in response to the request, determining a load that would be attributable to at least the resulting multiplied wireless communication with the UE of the data unrelated to the session. And the functions may include determining that the determined load would exceed a predefined threshold. The functions may then include, responsive to determining that the determined load would exceed the predefined threshold, taking action to limit communication with the UE.

Exemplary embodiments of the present invention have been described above. Those skilled in the art will understand, however, that changes and modifications may be made to these embodiments without departing from the true scope and spirit of the invention, which is defined by the claims.

We claim:

1. A method comprising:
  receiving into a radio access network (RAN) a request to serve a user equipment device (UE) over an air interface with data communication of a session, wherein serving the UE over the air interface with the data communication of the session will result in transmission time interval (TTI) bundling over the air interface of the data communication of the session and TTI bundling over the air interface of other data communication with the UE;

responsive to the request, determining by the RAN an air interface load that would be attributable to at least the TTI bundling of the other data communication with the UE over the air interface;

determining by the RAN that the determined air interface load would exceed a predefined threshold; and responsive to determining that the determined air interface load would exceed the predefined threshold, taking action by the RAN to limit communication over the air interface with the UE.

2. The method of claim 1, wherein the session is a packet-based real-time media session, wherein the RAN applies TTI bundling in response to the session being the packet-based real-time media session.

3. The method of claim 2, wherein the session is a voice over Internet Protocol (VoIP) session.

4. The method of claim 3, wherein the air interface is a Long Term Evolution (LTE) air interface, and wherein the VoIP session is a voice over LTE (VoLTE) session.

5. The method of claim 3, wherein the other data communication is unrelated to the VoIP session.

6. The method of claim 1, wherein determining the air interface load that would be attributable to at least the TTI bundling of the other data communication with the UE over the air interface comprises:
    determining a measure of actual data communication over the air interface with the UE preceding the request; and
    predicting the load by at least multiplying the determined measure by a predefined factor greater than one.

7. The method of claim 6, wherein TTI bundling has a bundling factor of four, and wherein the predefined factor is at least four.

8. The method of claim 7, further comprising:
    determining by the RAN that the other data communication comprises Transmission Control Protocol (TCP) data communication; and
    responsive to determining that other data communication comprises TCP data communication, using as the predefined factor a factor greater than four.

9. The method of claim 6, wherein determining the air interface load that would be attributable to at least the multiplied transmission of the other data communication with the UE over the air interface further comprises:
    determining as the air interface load a combination of at least (i) load that would be attributable to TTI bundling of the other data communication with the UE over the air interface and (ii) load that would be attributable to the TTI bundling of the data communication of the session over the air interface.

10. The method of claim 1, wherein the taking action to limit communication over the air interface with the UE comprises carrying out at least one function selected from the group consisting of (i) forcing a handover of the UE and (ii) throttling air interface communication with the UE.

11. The method of claim 1, further comprising determining by the RAN that the air interface is threshold highly loaded,
    wherein taking the action by the RAN to limit communication over the air interface with the UE is further responsive to the determining that the air interface is threshold highly loaded.

12. The method of claim 1, carried out by a base station of the RAN.

13. A method for managing wireless communication in a radio access network (RAN) that is configured to serve user equipment devices (UEs) over a Long Term Evolution (LTE) air interface, the method comprising:
    receiving by the RAN a request to serve a UE with a voice over LTE (VoLTE) call over the air interface, wherein the RAN is configured to respond to initiation of the VoLTE call by applying transmission time interval (TTI) bundling to non-VoLTE data communication with the UE over the air interface; and
    responsive to the request, (i) determining by the RAN an extent of non-VoLTE data communication with the UE preceding the request, (ii) predicting by the RAN an air interface load that would be attributable to at least the determined extent of non-VoLTE data communication when subjected to the TTI bundling, (iii) determining by the RAN that the predicted air interface load exceeds a predefined threshold, and (iv) responsive to determining that the predicted air interface load exceeds the predefined threshold, taking action by the RAN to limit communication over the air interface with the UE.

14. The method of claim 13, wherein the TTI bundling uses a TTI bundling factor greater than one, and wherein predicting the attributable load comprises computing the attributable load as a product of the determined extent and a multiplication factor that is at least the TTI bundling factor.

15. The method of claim 14, further comprising:
    determining by the RAN that the non-VoLTE data communication comprises Transmission Control Protocol (TCP) data communication; and
    responsive to determining that other data communication comprises TCP data communication, using as the multiplication factor a value that is greater than the TTI bundling factor.

16. The method of claim 13, wherein the taking action to limit communication over the air interface with the UE comprises carrying out at least one function selected from the group consisting of (i) forcing a handover of the UE and (ii) throttling air interface communication with the UE.

17. The method of claim 13, further comprising determining by the RAN that the air interface is threshold highly loaded,
    wherein taking the action by the RAN to limit communication over the air interface with the UE is further responsive to the determining that the air interface is threshold highly loaded.

18. A base station comprising:
    an antenna structure that radiates to define a coverage area for serving user equipment devices (UEs); and
    a controller that manages wireless communication via the antenna structure, wherein the controller comprises at least one processing unit, data storage, and program instructions stored in the data storage and executable by the at least one processing unit to carry out functions comprising:
    (a) detecting a request to wirelessly serve a UE with data communication of a packet-based real-time media session, wherein wirelessly serving the UE with the data communication of the packet-based real-time media session will result in transmission time interval (TTI) bundling of wireless communication with the UE of data unrelated to the packet-based real-time media session, (b) responsive to the request, determining a load that would be attributable to at least the resulting TTI bundling of wireless communication with the UE of the data unrelated to the session, (c) determining that the determined load would exceed a predefined threshold, and (d) responsive to determining that the determined load would exceed the predefined threshold, taking action to limit communication with the UE.

19. The base station of claim 18, wherein the packet-based real-time media session is a voice over Long Term Evolution (VoLTE) session, and wherein taking action to limit communication with the UE comprises a function selected from the group consisting of (i) forcing a handover of the UE and (ii) throttling communication with the UE.

* * * * *